No. 707,340. Patented Aug. 19, 1902.
A. A. MEDINA.
RUNNING GEAR FOR AUTOMOBILES.
(Application filed June 10, 1902.)
(No Model.)
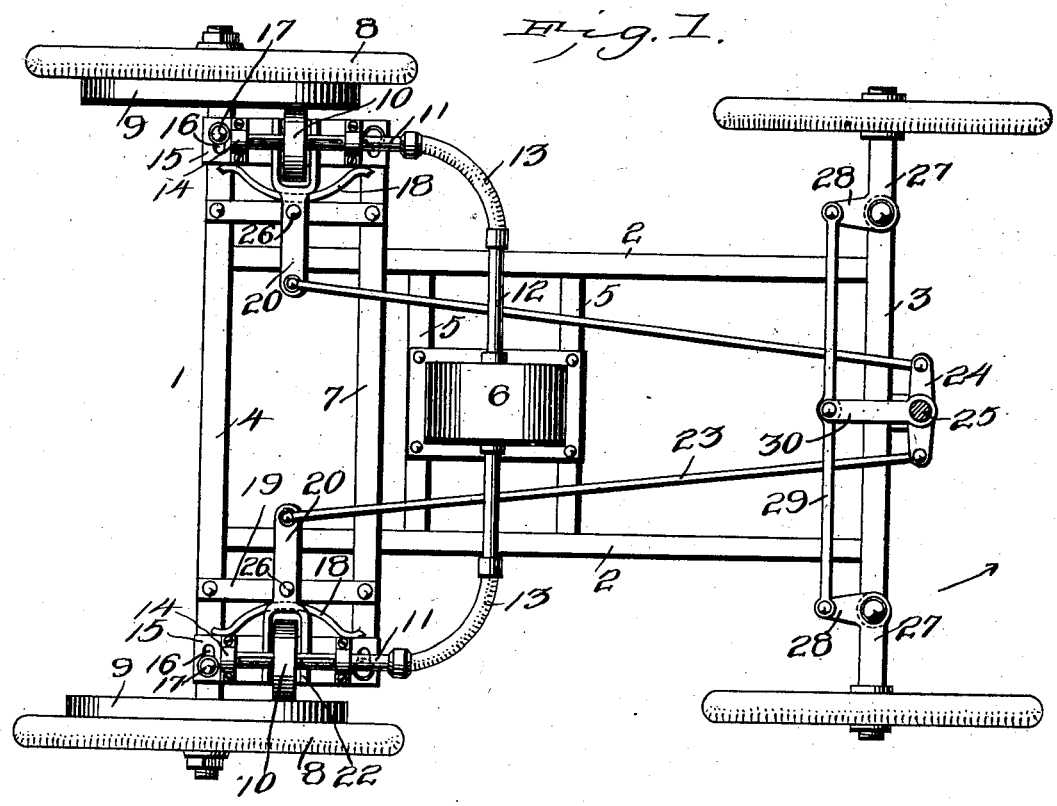
Fig. I.
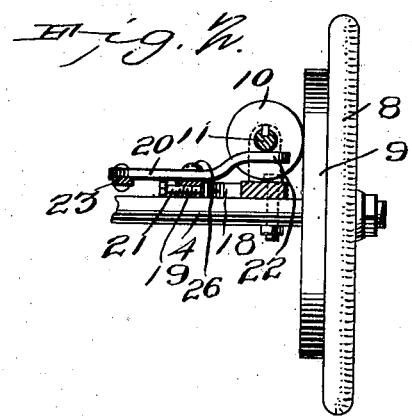
Fig. II.
Witnesses
A. A. Medina, Inventor
by C. A. Snow & Co.
Attorneys
THE NORRIS PETERS CO., PHOTO-LITHO., WASHINGTON, D. C.

UNITED STATES PATENT OFFICE.

ALBERT ALONZO MEDINA, OF EAST SAN JOSE, CALIFORNIA.

RUNNING-GEAR FOR AUTOMOBILES.

SPECIFICATION forming part of Letters Patent No. 707,340, dated August 19, 1902.

Application filed June 10, 1902. Serial No. 111,051. (No model.)

*To all whom it may concern:*

Be it known that I, ALBERT ALONZO MEDINA, a citizen of the United States, residing at East San Jose, in the county of Santa Clara and State of California, have invented a new and useful Running-Gear for Automobiles, of which the following is a specification.

The invention relates to improvements in running-gear for automobiles.

The object of the present invention is to improve the construction of running-gear for automobiles and to provide a simple and comparatively inexpensive construction capable of automatic adjustment when the vehicle is being turned, whereby the hind wheel at the off side, having the greatest distance to travel, will be driven more rapidly than the other hind wheel.

The invention consists in the construction and novel combination and arrangement of parts hereinafter fully described, illustrated in the accompanying drawings, and pointed out in the claims hereto appended.

In the drawings, Figure 1 is a plan view of the running-gear of an automobile constructed in accordance with this invention. Fig. 2 is a sectional view of one side of the running-gear.

Like numerals of reference designate corresponding parts in both figures of the drawings.

1 designates a frame composed of side bars 2, connected at their ends by front and rear axles 3 and 4 and between their ends by cross-bars 5, which support a motor 6. The side bars are also connected by a rear transverse bar 7, arranged parallel with the rear axle 4 and rigidly secured to the frame. The rear axle is also rigidly secured to the frame, and the rear wheels 8, which are arranged on the spindles of the rear axle, are provided at their inner faces with friction-wheels 9, which are engaged by friction wheels or pinions 10, whereby motion is communicated to the rear wheels 8 for driving the automobile or other vehicle. The friction-gearing is provided with flat engaging faces; but bevel friction-gear may be employed, as will be readily understood. The friction-pinions 10, which are splined to short longitudinal shafts 11, are slidably mounted on the same and are capable of movement simultaneously in opposite directions to provide variable speeds for driving the rear wheels, so that when the gear-wheel is turned the wheel having the greatest distance to travel will be driven more rapidly than the other rear wheel. The short longitudinal shafts 11, which are connected with the shaft 12 of the motor 6 by flexible sections 13, are journaled in suitable bearings 14 of slidable plates 15 and are provided with longitudinal grooves to receive the feathers or splines of the friction-pinions 10.

The slidable plates 15, which may be mounted upon the rear axle and the rear transverse bar 7 by any suitable means, are provided at their ends with slots 16, receiving suitable fastening devices 17 and permitting a limited sliding movement transversely of the vehicle. The inner edges of the slidable plates are engaged by bowed springs 18, interposed between the said plates and bars 19, which connect the rear axle and the transverse bar 7 and which form supports for transverse levers 20. The springs, which may be of any desired construction, are preferably arranged as shown, and their tension may be varied by adjusting-screws 21, mounted on the bars 19. The friction-pinions are yieldingly held in engagement with the friction-wheels 9 by the springs, and the desired frictional engagement may be readily obtained by adjusting the springs.

The transverse levers are provided with forked or bifurcated outer portions 22, which receive the friction-pinions 10, and the inner arms of the levers are connected by rods 23 with arms 24 of the steering lever or shaft 25 of the automobile. The levers and the bars 19 are perforated for the reception of pivot-bolts 26; but the levers may be fulcrumed in any other desired manner, as will be readily understood.

The front axle is provided with pivoted end sections 27, having arms 28, which are connected by a transverse bar or rod 29, and the latter is connected with an arm 30 of the steering-lever 25. When the steering-lever is turned in the direction of the arrow in Fig. 1, the friction-wheels will be simultaneously moved in opposite directions, one of the friction-wheels being carried toward the rear axle and the other being moved away from the same, whereby the rear wheels will be driven at different rates of speed. The transverse levers may be connected in any other suitable manner with the steering-gear to cause the friction-wheels to move simultaneously forward and rearward to vary the speed of the rear wheels of the automobile.

It will be seen that the running-gear is simple and comparatively inexpensive in construction, that it possesses great strength and durability, and that it is especially adapted for automobiles and other heavy vehicles. Furthermore, it will be clear that it will enable the power to be most advantageously applied in turning an automobile or other vehicle and that it is automatic in its operation in effecting this result.

What I claim is—

1. In a device of the class described, the combination with rear wheels provided with friction-wheels, of friction-pinions engaging the same, means for driving the friction-pinions, steering mechanism, and means operated by the steering mechanism for moving the pinions simultaneously in opposite directions to arrange them at different distances from the centers of the friction-wheels, whereby the rear wheels are driven at different speeds, substantially as described.

2. In a device of the class described, the combination of a frame, rear wheels, friction-wheels connected with the rear wheels, friction-pinions engaging the friction-wheels, means for driving the friction-pinions, and means for automatically moving the friction-pinions simultaneously in opposite directions to arrange them at different distances from the centers of the friction-wheels when the vehicle is being turned, substantially as described.

3. In a device of the class described, the combination of a frame, rear wheels provided with friction-wheels, longitudinal shafts supported by the frame, a motor connected with the said shafts, friction-pinions slidably mounted on the shafts and engaging the friction-wheels, levers fulcrumed on the frame and arranged to engage the friction-pinions and means for simultaneously oscillating the levers in opposite directions when the vehicle is turned, substantially as described.

4. In a device of the class described, the combination of a frame, rear wheels, friction-wheels connected with the rear wheels, friction-pinions engaging the friction-wheels and capable of movement to carry them toward and from the centers of the friction-wheels, and means for arranging the friction-pinions at different distances from the centers of the friction-wheels when the vehicle is being turned, substantially as described.

5. In a device of the class described, the combination of a frame, rear wheels provided with friction-wheels, plates slidably mounted on the frame, shafts journaled on the plates, friction-pinions slidably mounted on the shafts, springs engaging the plates and holding the pinions yieldably in engagement with the friction-wheels, a motor connected with the shafts, and means for sliding the pinions on the shafts, substantially as described.

6. In a device of the class described, the combination of a frame, rear wheels provided with friction-wheels, plates slidably mounted on the frame, shafts carried by the plates, springs engaging the plates, a motor connected with the shafts, levers having forked or bifurcated portions receiving the pinions, and steering mechanism connected with the levers, substantially as described.

7. In a device of the class described, the combination of a frame, rear wheels provided with friction-wheels, slidable plates mounted on the frame and provided with bearings and arranged longitudinally, friction-pinions slidably mounted on the shafts, a motor having a transverse shaft provided with flexible sections connected with the longitudinal shafts, transverse levers fulcrumed on the frame and connected with the pinions, springs engaging the said plates and means for operating the levers, substantially as described.

8. In a device of the class described, the combination of a frame, rear wheels provided with friction-wheels, longitudinal shafts mounted on the frame, friction-pinions slidably mounted on the longitudinal shafts and engaging the friction-wheels, a motor having a transverse shaft provided with flexible sections connected with the longitudinal shaft, and means for sliding the pinions on the longitudinal shafts when the vehicle is turned, substantially as described.

In testimony that I claim the foregoing as my own I have hereto affixed my signature in the presence of two witnesses.

ALBERT ALONZO MEDINA.

Witnesses:
L. F. BUTTS,
F. H. BENSON.